United States Patent [19]

Pavel

[11] Patent Number: 5,201,003
[45] Date of Patent: Apr. 6, 1993

[54] HIGH FIDELITY STEREOPHONIC REPRODUCTION SYSTEM

[76] Inventor: Andreas Pavel, via Vinzenzo Monti 92, Milan, Italy, 20145

[21] Appl. No.: 869,738

[22] Filed: Apr. 16, 1992

Related U.S. Application Data

[60] Continuation of Ser. No. 779,112, Oct. 15, 1991, abandoned, which is a continuation of Ser. No. 674,412, Mar. 21, 1991, abandoned, which is a continuation of Ser. No. 382,048, Jul. 19, 1989, abandoned, which is a continuation of Ser. No. 105,168, Oct. 7, 1987, abandoned, which is a continuation-in-part of Ser. No. 539,232, Oct. 5, 1983, abandoned, Division of Ser. No. 265,124, May 19, 1981, Pat. No. 4,412,106, which is a continuation of Ser. No. 47,967, Jun. 12, 1979, abandoned, which is a continuation-in-part of Ser. No. 889,664, Mar. 24, 1978, abandoned.

[30] Foreign Application Priority Data

Mar. 24, 1977 [IT] Italy .................................. 21625 A/77
Jul. 22, 1987 [DE] Fed. Rep. of Germany ....... 3724208

[51] Int. Cl.$^5$ ............................................. H04R 5/02
[52] U.S. Cl. ...................................... 381/25; 379/438
[58] Field of Search ....................... 381/1, 25, 24, 187; 379/438

[56] References Cited

U.S. PATENT DOCUMENTS 4,412,106 10/1983 Pavel ..................................... 381/25
4,764,962 8/1988 Ekman et al. ......................... 381/25

FOREIGN PATENT DOCUMENTS 121582 12/1980 Japan .

OTHER PUBLICATIONS

Radio Shack Catalog, 1986 (©1985), p. 109.

Primary Examiner—Forester W. Isen
Attorney, Agent, or Firm—Lerner, David, Littenberg, Krumholz & Mentlik

[57] ABSTRACT

A personal stereo sound system device, of no larger than hand size for carrying and using on the person of at least one individual listener, has a miniaturized playback program source with control of program selection, a stereo amplifier, a volume adjuster, a power source, a multi-conductor lead for electrically connecting the amplifier to miniaturized lightweight stereo headphones or earphones, and a lead-reeling device capable of receiving and of dispensing a desired length of the lead to permit the phones to be used at a variable distance from the amplifier.

14 Claims, 5 Drawing Sheets

HIGH FIDELITY STEREOPHONIC REPRODUCTION SYSTEM

This application is a continuation of my co-pending U.S. patent application Ser. No. 07/779,112 filed Oct. 15, 1991, now abandoned which is a continuation of U.S. patent application Ser. No. 07/674,412 filed Mar. 21, 1991, now abandoned, which is a continuation of U.S. patent application Ser. No. 07/382,048 filed Jul. 19, 1989, now abandoned, which is a continuation of U.S. patent application Ser. No. 07/105,168 filed Oct. 7, 1987, now abandoned, which is a continuation-in-part of U.S. patent application Ser. No. 06/539,232 filed Oct. 5, 1983, now abandoned, which is a division of U.S. patent application Ser. No. 06/265,124 filed May 19, 1981, now U.S. patent No. 4,412,106, which is a continuation of U.S. patent application Ser. No. 06/047,967 filed Jun. 12, 1979, now abandoned, which is a continuation-in-part of U.S. patent application Ser. No. 06/889,664 filed Mar. 24, 1978, now abandoned.

BACKGROUND OF THE INVENTION

Devices for the reproduction of music and other sounds, either broadcast or reproduced from magnetic tape or disc, are increasingly popular forms of recreation and cultural development. High fidelity stereophonic systems, in particular, have grown into a form of mass leisure and become the basis of a strongly growing audio industry.

The present invention relates generally to audio reproduction systems, and particularly to systems of the high fidelity type, which are essentially concerned with the faithful recreation of sound events or, more exactly, with the recreation of sound sensations that is as close as possible to the sound sensations that a listener would have received at the place and time of the original event, with regard to frequency range, dynamics, impulse behaviour, noise, distortion (or shortly, sound quality) and, most of all, in the case of stereophonic systems, with the local (space) and temporal (phase, delay) determinants of the sound sensations. Totally, high fidelity stereophonic systems should be able to provide the whole depth and detail that the human ear can detect in the presence of original sound events. Such a task, obviously, can only be achieved through the use of particular and partly complex high fidelity technologies.

The invention relates further to battery-operated cassette devices of stereophonic high fidelity type, and to high fidelity earphone and headphone applications and to the art of binaural stereophonic reproduction in general.

OBJECT OF THE INVENTION

A first object of the invention is to provide improvements permitting a lead, serving for connecting the stereo audio output of the apparatus to the user's earphones or headphones, to be reeled out, and retracted, as desired so that amongst other advantages the lead does not remain external to the apparatus when not in use and thus does not tend to get tangled, and also the user may make the lead just as long as is desired at any time of use.

A second object of the invention is to provide improvements permitting lead-reeling means, for the lead serving for connecting the stereo audio putput of the apparatus to the user's earphones or headphones, to be a separable component which can be attached to and detached from the remainder of the apparatus, whereby for instance if any repair is needed to the reeling means it can be serviced separately from the remainder of the apparatus.

A third object of the invention is to provide improvements permitting the stereo output lead to be connected permanently to a pair of earphones or headphones, or to be connectable to, and disconnectable from, the earphones or headphones.

A fourth object of the invention is to provide improvements permitting a plurality of the above-mentioned lead-reeling means to be interconnected, in stacked formation, for possible use of more than one pair of earphones or headphones with a single apparatus.

SUMMARY OF THE INVENTION

According to the present invention, a personal hand size stereo sound system device, to be carried and used on the person of at least one individual listener, comprises the combination of:

(i) a miniaturized program source playback device, including control means for program selection, arranged to produce simultaneous mutually different stereo program output signals, (ii) miniaturized stereo signal amplifier means, including output volume adjusting means, impedance matched to and arranged to receive said stereo output signals from said source device, (iii) miniaturized lightweight paired stereo headphone or earphone means, which is the only sound reproduction means, physically remote from said source device, impedance and sensitivity matched to and arranged to receive separately, one signal for each phone, the output signals of said amplifier means and to reproduce music with life-like volume, (iv) multi-conductor lead means for electrically connecting said amplifier means to said phone means, (v) lead-reeling means capable of receiving and of dispensing a desired length of said lead means to permit the phone means to be used at a variable distance from said amplifier means, (vi) power source means comprising a battery electrically connected to said amplifier means and to said source device.

BRIEF DESCRIPTION OF THE DRAWINGS

The functional and constructive characteristics of the present invention will become more apparent from the following description, in which reference is made to the accompanying drawings which illustrate some exemplificative and not limitative embodiments of the invention for high fidelity stereophonic reproduction, and wherein.

DESCRIPTION OF THE PREFERRED EMBODIMENTS

Figure 1:
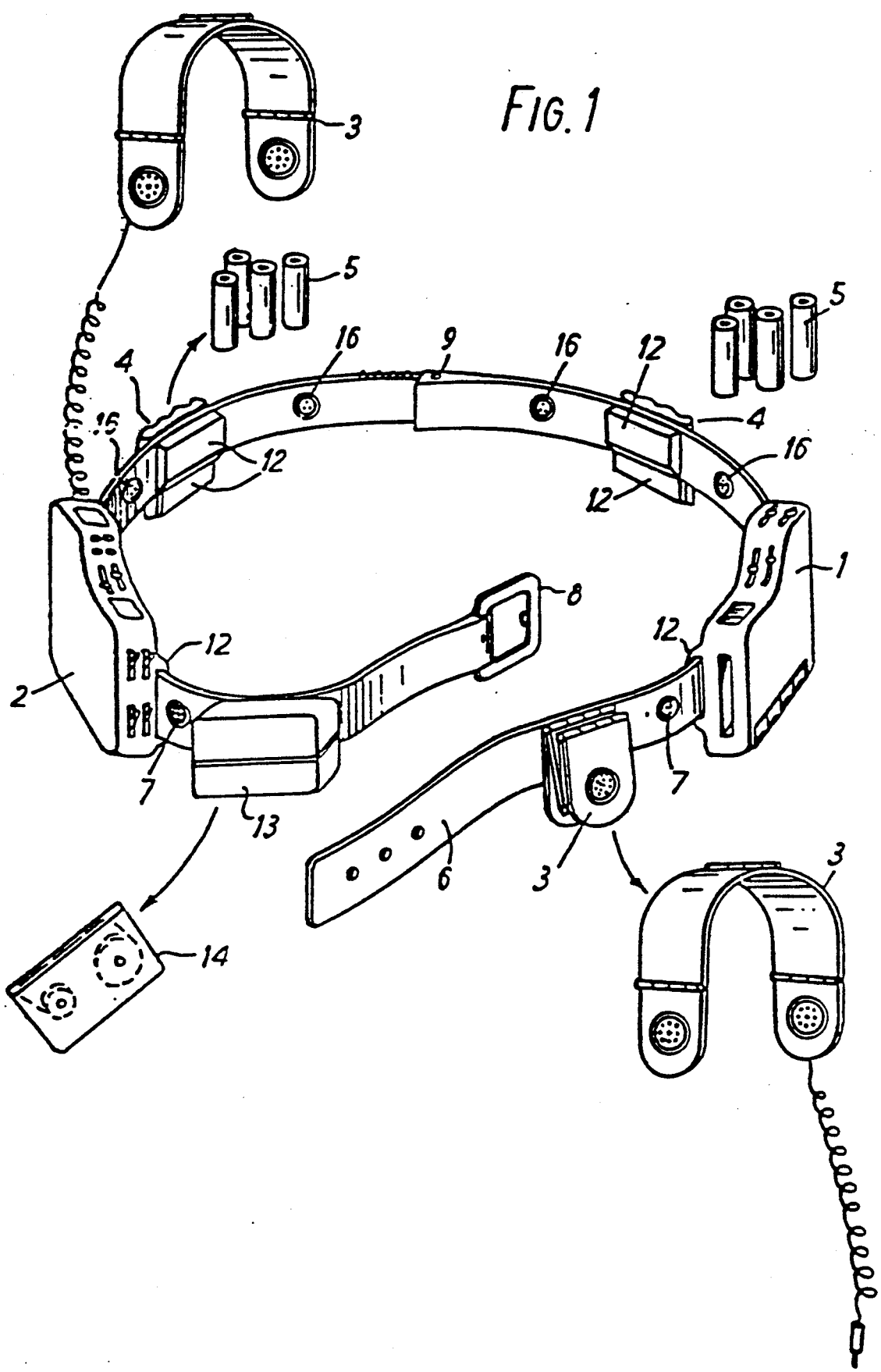
FIG. 1 is a front view of a first embodiment having a belt-like garment, equipped with devices for high fidelity stereophonic reproduction.
Figure 2:
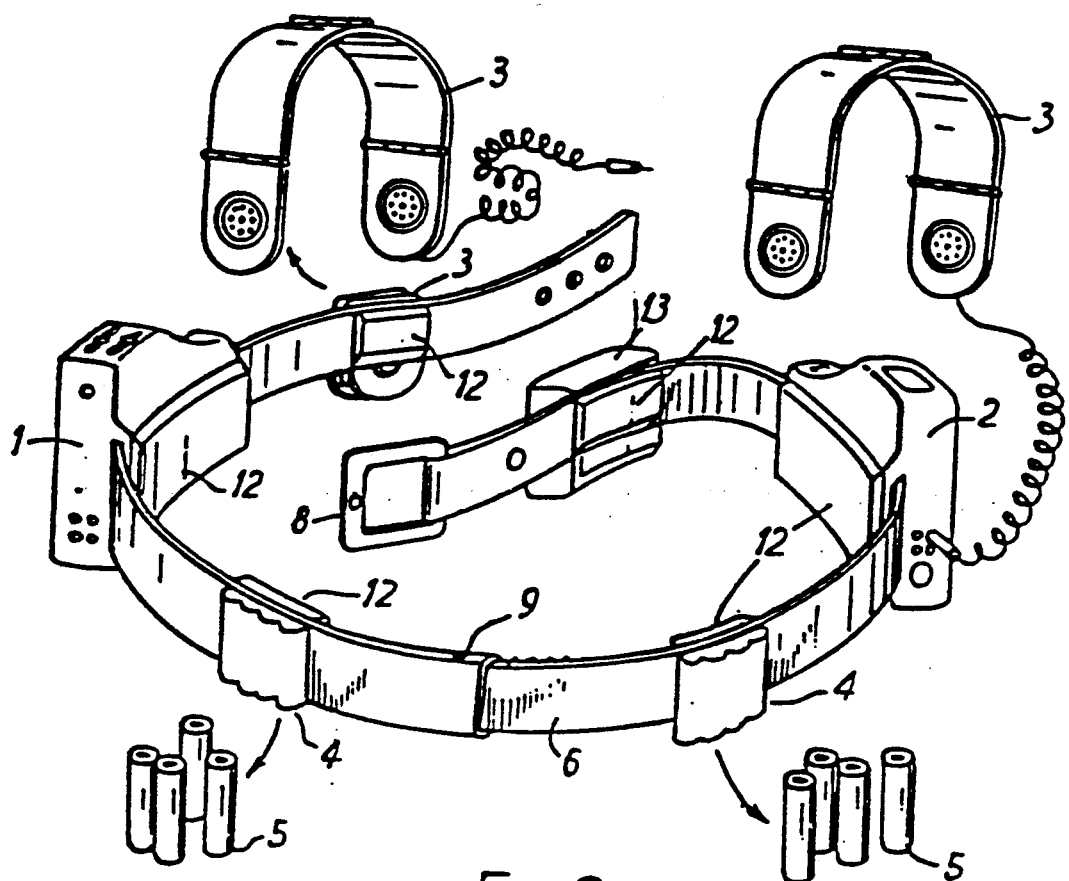
FIG. 2 is a back view of the same garment.
Figure 3:
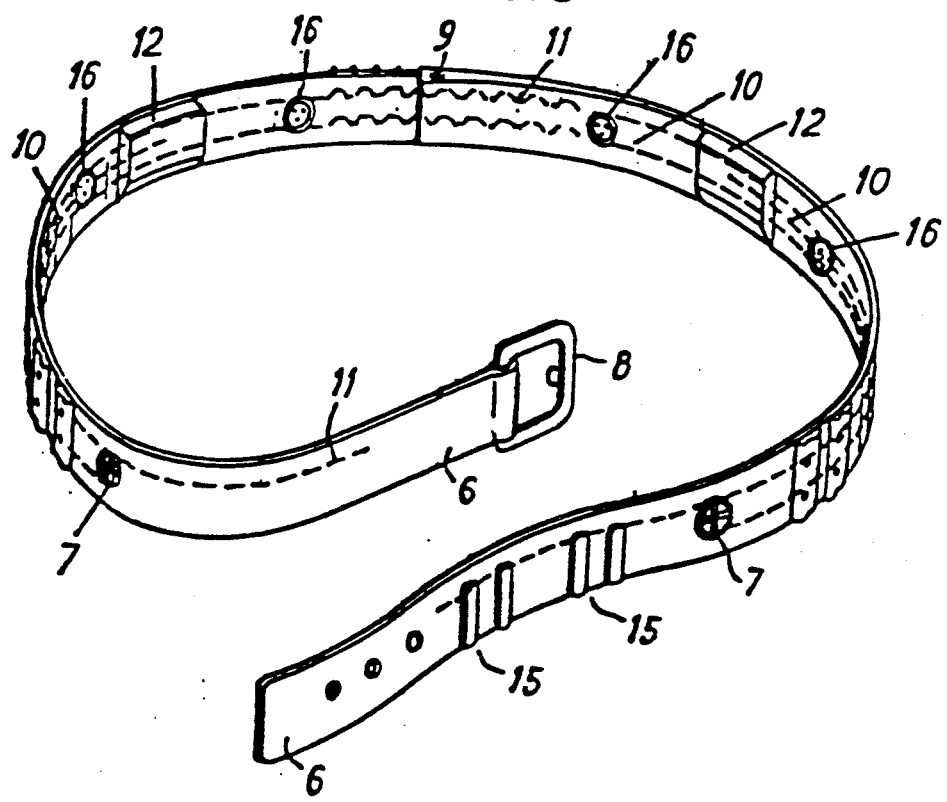
FIG. 3 is a view of a supporting and interconnective band without any of the casings and respective devices.
Figure 4:
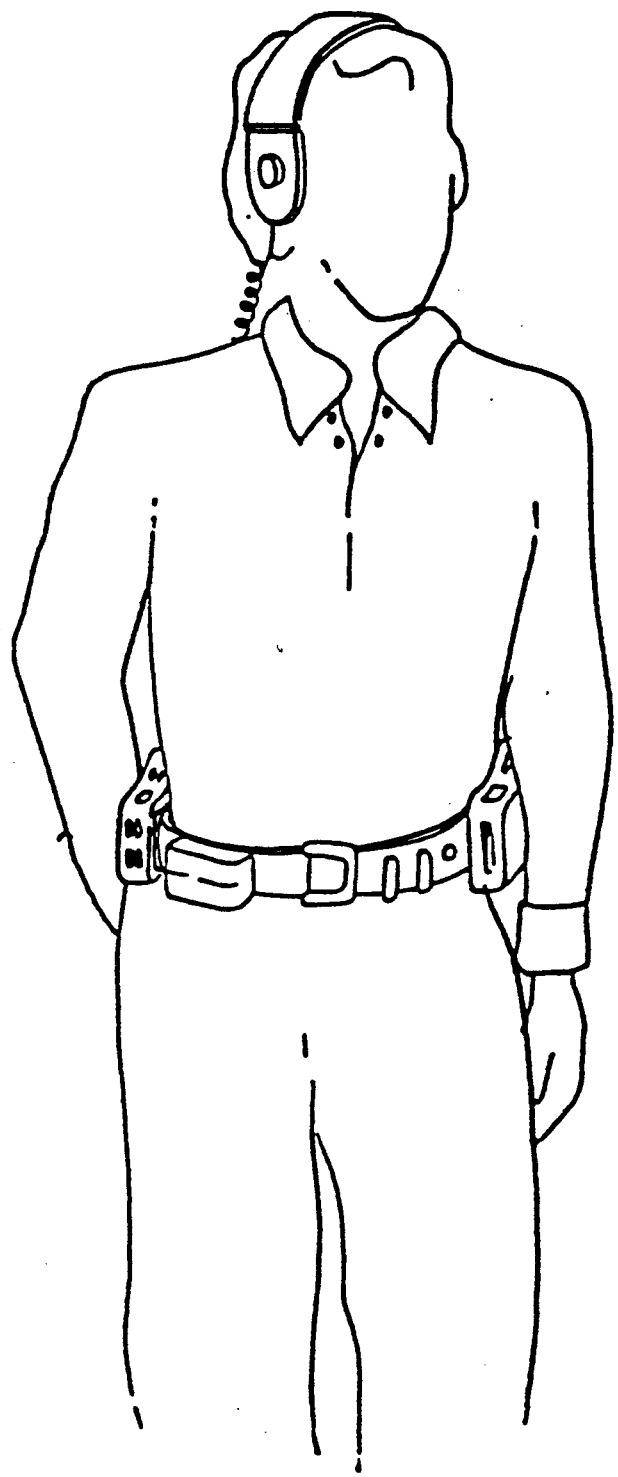
FIG. 4 illustrates an example of application of the first embodiment of the present invention.

The high fidelity stereophonic reproduction apparatus, as seen in FIGS. 1–4, includes five main parts:
(i) a playback device 1
(ii) a pair of high fidelity headphone amplifiers 2
(iii) a pair of high fidelity headphones or earphones 3
(iv) one or more battery casings 4, containing batteries 5
(v) a supportive and interconnective band 6.

In the preferred embodiment, at least five other parts are equally important:
(vi) a pair of miniature microphones 7
(vii) a pair of microphone amplifiers
(viii) four-channel mixing circuitry
(ix) a high fidelity broadcast FM receiver
(x) an FM stereo decoder.

The following accessory elements complete the basic arrangement:
(xi) a buckle 8
(xii) an extensible portion 9
(xiii) interconnective wiring for signal and power transmission 10
(xiv) an antenna 11.

The invention may further comprise:
(xv) a number of padding cushions 12
(xvi) a support structure or casing 13 for magnetic tape cassettes 14
(xvii) another structure 15 to support the headphones 3 in collapsed form
(xviii) a plurality of contact transducers 16
(xix) spring/mass damping mechanics for the suspension of the playback device and various circuits.

Naturally, it is understood that the instant belt-like garment be so designed that all its circuits and devices are miniaturized to the utmost and built into the band 6 in a compact and integrative way, and that they may be contained in any number of housings, variously distributed alongside the band, no larger than hand size.

Referring now to its constituent parts in more detail, the belt-like garment for high fidelity stereo-phonic reproduction comprises a high fidelity playback device 1 effective to pick up stereophonic audio signals from magnetic tape cassettes 14 or other carriers of recorded audio information (memory devices) and supply them to an output end, which connects to a pair of high fidelity headphone amplifiers 2 by means of wire connections 10, arranged between two layers of the supporting band 6.

The supporting and interconnecting band 6 is made of any flexible material of suitable strength, and it is provided with a buckle 8 or any closing means effective to connect the two belt ends (for instance pressure buttons). The same band is preferably formed with an extensible portion 9, formed by elastic material, slide-in members, or any other means allowing for contraction and expansion, to provide for exact positioning of the devices 1 and 2 on the left and right waist area of different users. Said devices 1 and 2 are provided with protective casings and have the controls needed for their activation on the surface of these casings, ergonometrically optimized for easy reach of hand and view. The casings are fastened to the supportive and interconnective band 6 by any coupling means adapted to hold them firmly in place, in such a way that the signal and power connection ends of the devices 1 and 2 meet the appropriate wire ends emerging at the outer convex face of the supportive band 6. Said coupling means should preferably be formed as snap-in arrangements to allow for easy removal of the devices from the supportive band. A plurality of padding cushions 12 or a padding strip are located at the inner concave face of the supportive band 6 and at the casing surfaces in direct contact with the user's body to protect it from any pressure of the casings 1, 2, 4, 12, 15, or other rigid parts on the skin. The fixation of the devices 1, 2 and other circuitry in their respective casings, or the fixation of said casings onto the supportive band, may be obtained with the inclusion of spring/mass damping systems located between the casings and the devices contained therein, or between the coupling parts and all other parts of the devices 1 and 2 or integrated to the coupling parts located on the band 6, wherein said damping systems have low-pass characteristics that adequately isolate the reproduction devices from shocks and vibrations, above a predetermined frequency, originating from the user's bodily movements.

The playback device 1, the headphone amplifiers 1 and all other circuitry that may optionally be included and is referred to below, are adapted for battery operation.

The belt-like garment for high fidelity stereophonic reproduction may also include a plurality of contact transducers 16 distributed alongside the inner face of the supporting band 6, and adapted to the reproduction of bass range signals supplied by the headphone amplifier and transmitted by means of suitable wiring, which runs between two layers of the supportive band. Said contact transducers 16, or body transducers, supply tactile bass sensations to the listener's body. The bass signals may be filtered by a low-pass filter circuit at the amplifier output, and they may be supplied by the left and right program channel to transducers located on the left and right portion of the band 6, respectively, or they may come from a single channel resulting from the addition of the left and right signal. Additional contact transducers may be positioned at the concave faces of two shoulder strips provided with signal conductors, and connected at both ends to the supportive and interconnective band 6.

Figure 5:
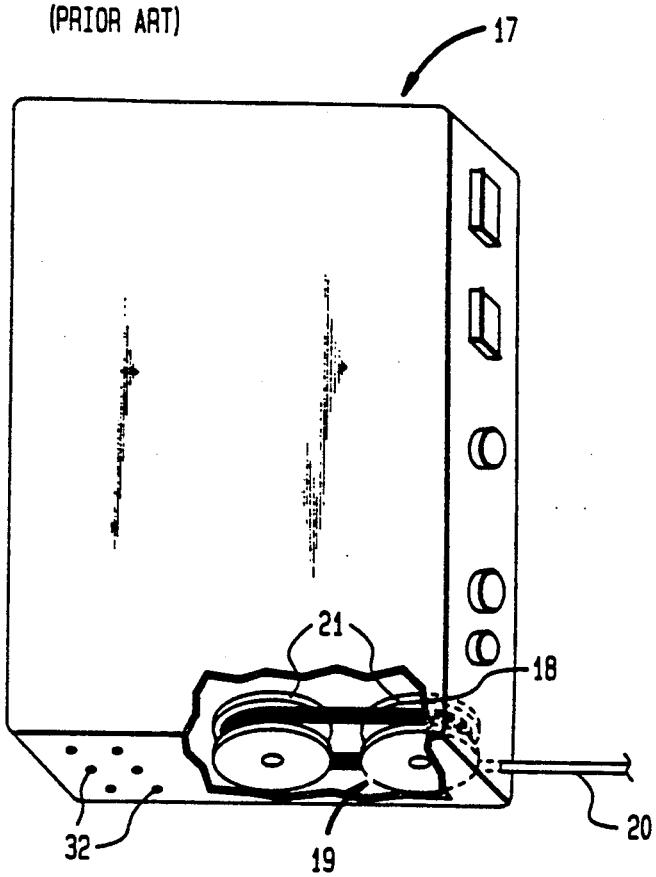
FIG. 5 is a perspective view of a modified apparatus in which all of the components, other than the earphones or headphones, are contained within a single casing provided with wire-reeling means.

Referring now to FIG. 5, there is shown a casing 17 for a hand-size portable stereo high fidelity cassette reproducer. All of the components of the reproducer including a stereo headphone amplifier, but other than earphones or headphones for use with it, and all of the controls, power source and the like are incorporated in or on the casing 17. Details of the construction and circuitry of the reproducer may be as set out above, but do not necessarily form part of the invention, and other arragements therefor will be well within the general knowledge of a person skilled in the electronics art.

Figure 6A:
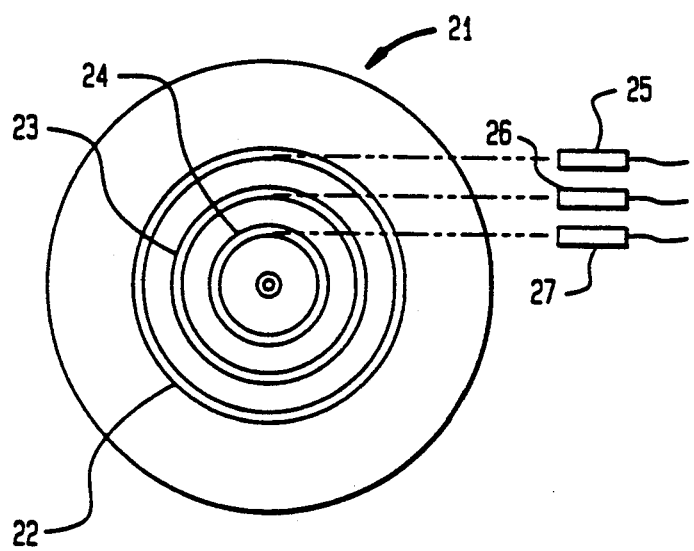
FIG. 6A is a side elevation of a lead-reel to show slip ring contacts.
Figure 6B:
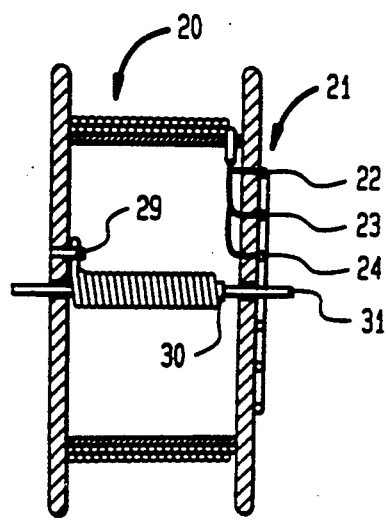
FIG. 6B is a front elevation of the lead reel to show spring-loading means for the reel.

The casing 17 has, at one end, a compartment 18, in which is positioned a lead-reeling assembly 19 for a multi-core lead 20 which serves to feed the respective stereo outputs to a pair of earphones or headphones, not shown in this figure. The lead-reeling assembly comprising a pair of reels 21 mounted for rotation and spring-urged in the direction to reel-in the lead 20. FIGS. 6A and 6B show slip-rings 22, 23, 24 coacting with brushes 25, 26, 27 to enable the stereo outputs to be fed to one of the rotary reels 21. A coiled spring 28 is coupled between a lug 29 on the reel, and a fixed pin 30 on a stationary axle 31 for the reel. A ratchet mechanism, such as the well-known centrifugal type used on roller blinds, may be incorporated to permit the reel(s) to be held in a fixed position of unreeling, against their return spring-loading, and to be released to re-wind the lead 20 by exerting a further small extending pull on the lead 20, and thereafter releasing the lead 20. Means, not shown, may be provided for ensuring a relatively even speed of reeling-in of the lead 20.

With the apparatus as so far described, the user can transport, or store, the apparatus with the lead 20 fully reeled in, and when use of the apparatus with earphones or headphones is desired, the user can pull out the lead 20 to the extent required.

The earphones or headphones can be permanently attached, or separable, in the manner described below with reference to FIG. 7.

The stereo outputs, and any other input or output connections required, may also be linked to sockets 32 disposed on an end wall of the casing, for a purpose also to be described with reference to FIG. 7.

Figure 7:
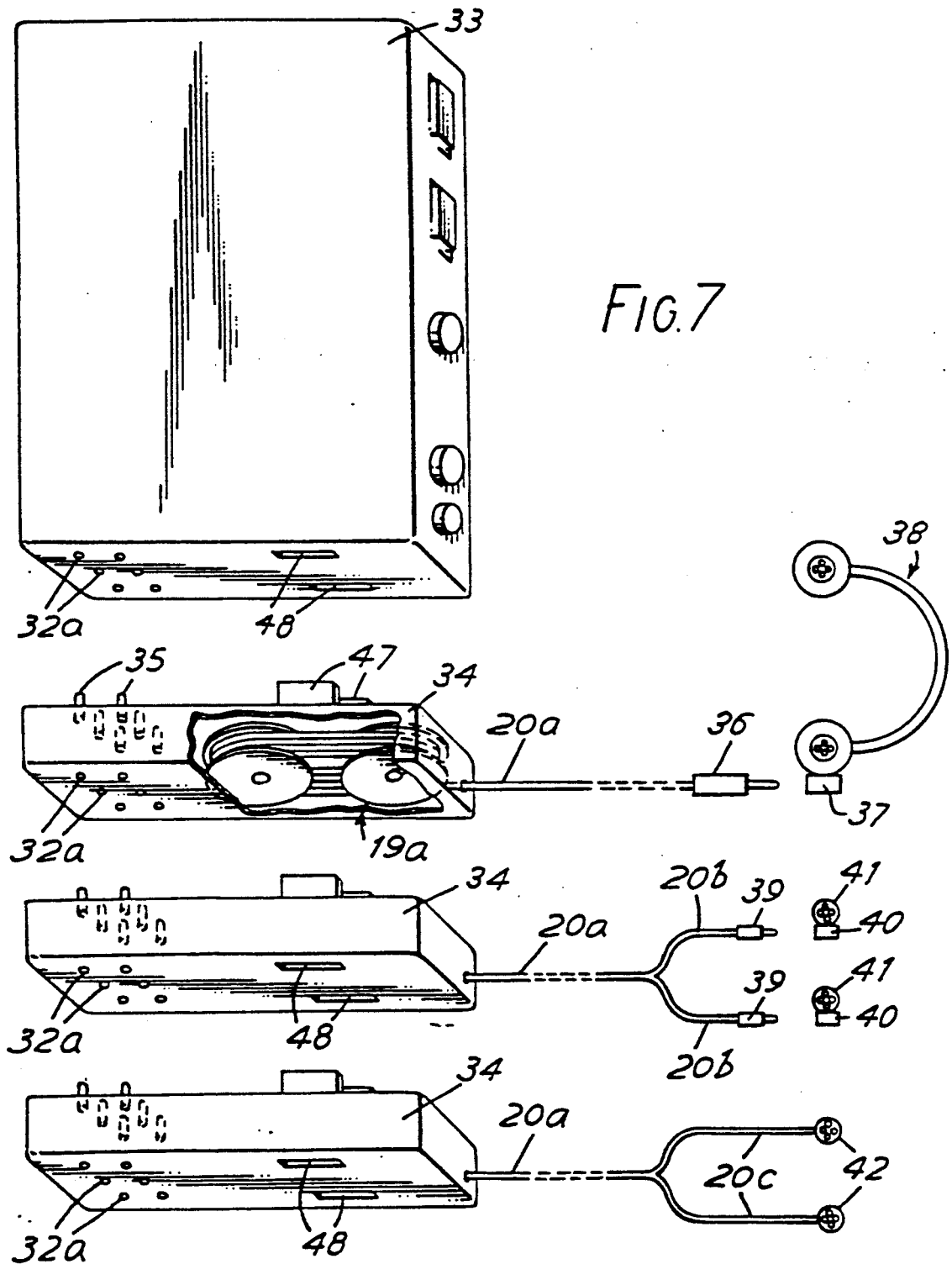
FIG. 7 is a perspective view, with parts shown in separated condition, of a further modified apparatus in which all of the components, other than the earphones or headphones, are contained within a single casing, and lead-reeling means for the earphones or headphones are contained in a separable lead-reeling pack.

Referring now to FIG. 7 there is shown an apparatus which again comprises a casing 33 which contains all of the components, controls and ancillaries of a hand-size portable stereo high fidelity cassette reproducer, other than the earphones or headphones for use with it, but in this construction there is no compartment equivalent to the compartment 18 of FIG. 5. In this construction there is provided a separable lead-reeling pack denoted generally by reference numeral 34. The pack 34 contains a lead-reeling assembly 19a which is constructed similarly to the assembly 19 of FIG. 5. The pack 34 is connectable to the casing 33, for electrical purposes, by a plurality of plugs 35 which can be engaged into the corresponding female sockets 32a of the casing 33, for transferring the stereo audio outputs to the lead 20a.

In this figure there are shown three packs 34. In the uppermost pack 34, in the drawing, the lead 20a has at its free end a multi-way jack plug 36 which can be engaged into a multi-way jack socket 37 mounted on, or connected by a short conductor to, a pair of stereo headphones 38.

In the next power pack 34, the lead 20a is branched to provide two separate leads 20b, 20b each of which carries at its free end a two-way multi-plug 39 to be received in a two-way multi-socket 40 on a respective earphone 41.

In the lowermost pack 34, the lead 20a is branched to form two leads 20c, 20c, each of which is permanently connected to a respective earphone 42.

It will be appreciated that any desired number of the packs 34 can be stacked and interconnected, for stereo output, on the same casing 33, enabling more than one person to have their earphones or headphones operating from the same source. It will be apparent also that the plugs 35 and sockets 32a can be utilised for transfer of stereo output from the casing to one or more of the stacked packs 34 irrespective of whether the earphones or headphones of any intermediate stack or stacks are in use.

If the plugs 35 and sockets 32a are suitably sturdy in construction, and are sufficient in number, they alone may be sufficient for mechanical engagement of a pack 34 on the casing 33 or for engagement of one pack 34 on another pack 34. However, as a further improvement, other mechanical engagement means may be provided to act between the pack 34 and the casing 33 or another pack 34 on which it is to be stacked. Such engagement means may be, for example, one or more tongues or lugs 43 on the pack 34, to engage into and be releasably gripped by a socket 48 on the casing 33 or on the pack 34.

A single reel may be used for receiving the wound-up lead.

As an alternative to the return spring-loading of the reel(s), provision may be made for manual re-winding of the real, or for drive by a miniature clockwork motor or an electric motor powered by the power supply of the apparatus or by a separate supply, e.g. a separate battery housed in the pack.

Preferably, provision is made for housing the headphones, 38 in FIG. 7. in a cavity in the body of the casing 33, for which purpose they are advantageously made foldable. Likewise, provision may be made for housing of the separable earphones, 41 or 42 in FIG. 7, in a cavity in the casing 33, in the case of the separable earphones, or in a cavity in the pack 34 in the case of the permanently connected earphones.

With the separable headphones 38, or the separable earphones 41, there is the advantage that the user can substitute other headphones/earphones of a different type, e.g. of a superior quality.

A pack 34 may further include a miniaturized headphone/earphone amplifier feeding its output terminals 32a (FIG. 7) so that when a further pair of headphones/earphones are added there is no diminution in volume.

I claim:

1. A self-contained, portable, personal, stereophonic, high fidelity listening system, to be carried and operated on the body of a listener so that the listener can freely move about and use his or her hands while listening to stereophonic music, said system comprising, in combination:
    (a) a casing;
    (b) signal-producing means, including a playback device, for producing stereophonic, electrical signals from a carrier of recorded, musical programs, said signal-producing means being disposed within said casing;
    (c) at least one pair of lightweight, binaural, stereophonic earphones, electrically matched in impedance and sensitivity to said signal-producing means and physically remote from said means, for producing high fidelity, stereophonic musical sound in response to said signals, said system having no means other than said earphones for the production of stereophonic, musical sound at a level of fidelity equal to, or greater than, said high fidelity, stereophonic musical sound produced by said earphones;
    (d) means for support of said earphones substantially in contact with the ears of said listener;
    (e) an electrical conductor for electrically connecting said earphones to said signal-producing means;
    (f) lead-reeling means for holding said conductor, and for receiving and dispensing a desired length of said conductor;

(g) a reel pack detachably connected to said casing, said lead-reeling means being disposed within said pack; and (h) means on said reel pack for mechanical and electrical, releasably-gripped, connection to, and disconnection from, said casing and another like reel pack.

2. A system as in claim 1, wherein said lead-reeling means comprises return spring-loading for reeling in the conductor.

3. A system as in claim 1, wherein said lead-reeling means comprises means for manually reeling in the conductor.

4. A system as in claim 1, wherein said lead-reeling means comprises an electric motor for reeling in the conductor.

5. A system as in claim 1, further comprising a two-part electrical connector, and wherein one part of said connector is connected to one end of said conductor and the other part of said connector is connected to said earphones.

6. A system as in claim 1, wherein said conductor is branched at one end, and each branch is connected to one phone of said earphone.

7. A system as in claim 6, wherein each branch of said conductor comprises a disconnectable two-part electrical connector.

8. A self-contained, portable, personal, stereophonic, high fidelity listening system, to be carried and operated on the body of a listener so that the listener can freely move about and use his or her hands while listening to stereophonic music, said system comprising, in combination:

(a) a casing;

(b) signal-producing means, including a radio, for producing stereophonic, electrical signals from a radio broadcast of musical programs, said signal-producing means being disposed within said casing;

(c) at least one pair of lightweight, binaural, stereophonic earphones, electrically matched in impedance and sensitivity to said signal-producing means and physically remote from said means, for producing high fidelity, stereophonic musical sound in response to said signals, said system having no means other than said earphones for the production of stereophonic, musical sound at a level of fidelity equal to, or greater than, said high fidelity, stereophonic musical sound produced by said earphones;

(d) means for support of said earphone substantially in contact with the ears of said listener;

(e) an electrical conductor for electrically connecting said earphones to said signal-producing means;

(f) lead-reeling means for holding said conductor, and for receiving and dispensing a desired length of said conductor;

(g) a reel pack detachably connected to said casing, said lead-reeling means being disposed within said pack; and (h) means on said reel pack for mechanical and electrical, releasably-gripped, connection to, and disconnection form, said casing and another like reel pack.

9. A system as in claim 8, wherein said lead-reeling means comprises return spring-loading for reeling in the conductor.

10. A system as in claim 8, wherein said lead-reeling means comrises means for manually reeling in the conductor.

11. A system as in claim 8, wherein said lead-reeling means comprises an electric motor for reeling in the conductor.

12. A system as in claim 8, further comprising a two-part electrical connector, and wherein one part of said connector is connected to one end of said conductor and the other part of said connector is connected to said earphones.

13. A system as in claim 8, wherein said conductor is branched at one end and each branch is connected to one phone of said earphones.

14. A system as in claim 13, wherein each branch of said conductor comprises a disconnectable two-part electrical connector.

* * * * *